United States Patent [19]

Crosby et al.

[11] Patent Number: 4,695,602

[45] Date of Patent: Sep. 22, 1987

[54] FIBER REINFORCED THERMOPLASTICS CONTAINING SILICONE INTERPENETRATING POLYMER NETWORKS

[75] Inventors: Jane M. Crosby, Wilmington, Del.; MaryGail K. Hutchins, Philadelphia, Pa.

[73] Assignee: LNP Corporation, Malvern, Pa.

[21] Appl. No.: 707,121

[22] Filed: Feb. 28, 1985

[51] Int. Cl.[4] .......................... C08K 7/16; C08K 7/14; C08K 7/10; C08K 7/06

[52] U.S. Cl. ..................................... 524/439; 524/440; 524/441; 524/500; 524/537; 524/538; 524/539; 524/540; 524/542; 524/514; 525/100; 525/104; 525/106; 525/422; 525/425; 525/426; 525/427; 525/431; 525/903

[58] Field of Search ............... 524/538, 514, 500, 537, 524/539, 540, 542, 861, 862, 866, 404, 439, 440, 441; 525/431, 426, 903, 100, 104, 106, 422, 425, 427

[56] References Cited

U.S. PATENT DOCUMENTS

| | | | |
|---|---|---|---|
| 3,288,879 | 11/1966 | Safford | 525/105 |
| 3,960,985 | 6/1976 | Cooper | 525/106 |
| 4,221,728 | 9/1980 | Jaquiss et al. | 524/537 |
| 4,230,815 | 10/1980 | Itoh et al. | 525/101 |
| 4,265,801 | 5/1981 | Moody et al. | 524/538 |
| 4,373,038 | 2/1983 | Moraw et al. | 524/440 |
| 4,393,161 | 7/1983 | Van Abeelen et al. | 524/506 |
| 4,412,032 | 10/1983 | Gaske et al. | 524/538 |
| 4,465,804 | 8/1984 | Sorensen | 524/514 |
| 4,500,688 | 2/1985 | Arkles | 525/431 |

*Primary Examiner*—Lewis T. Jacobs
*Attorney, Agent, or Firm*—Panitch Schwarze Jacobs and Nadel

[57] ABSTRACT

The detrimental effects of reinforcing fibers on the differential shrinkage and warpage characteristics of thermoplastic resins are substantially reduced by the incorporation of a silicone interpenetrating polymer network in fiber reinforced thermoplastic composites. High modulus (flexural modulus greater than 90,000 psi) thermoplastic matrices containing about 5 to 60 weight percent reinforcing fibers and 1 to 20 weight percent of a silicone IPN have reduced shrinkage and warpage and more isotropic mold shrinkage than conventional fiber reinforced thermoplastics, and are particularly useful in the melt forming of high tolerance parts, such as gears, as well as thin walled, variable thickness and thick cross section parts.

22 Claims, No Drawings

FIBER REINFORCED THERMOPLASTICS CONTAINING SILICONE INTERPENETRATING POLYMER NETWORKS

BACKGROUND OF THE INVENTION

The present invention relates to fiber reinforced thermoplastics which are modified to reduce shrinkage and warpage. More particularly, the invention relates to fiber reinforced thermoplastic composites modified with silicone interpenetrating polymer networks.

For many years, it has been known that the mechanical properties of thermoplastics could be significantly increased by the addition of reinforcing fibers. Traditionally, such fibers have included glass, carbon and mineral fibers, while more recently more sophisticated fibers such as aramid, ceramic, boron and metal fibers have been used for special applications.

A serious detrimental effect of reinforcing fibers in thermoplastic resins is the tendency of reinforced thermoplastic composites to warp after molding (post-warpage). Moreover, the introduction of reinforcing fibers in the thermoplastic resin aggravates the problem of differential mold shrinkage, namely the tendency of the resin to shrink more in the direction transverse to the direction of flow than in the direction of flow. This differential is apparently due to the tendency of the reinforcing fibers to align themselves generally in the direction of flow of the resin melt and is at least partially responsible for the post-warpage.

Increased differential shrinkage and warpage are particularly serious problems in the production of high tolerance parts, such as gears. These are also serious problems in the molding of thin walled and variable thickness parts. Further, in thick cross section moldings (i.e. ¼ inch or greater thickness), the differential shrinkage causes high stress formation, resulting in stress cracking and voids. In these and other applications, it is highly desirable to have a minimum of shrinkage and warpage, as well as essentially isotropic shrinkage behavior.

In the past several years, Petrarch Systems Inc. of Bristol, Pennsylvania has developed a new class of melt processable thermoplastics which contain silicone interpenetrating polymer networks (IPN's). These compositions are sometimes referred to as pseudo-interpenetrating polymer networks (pseudo- or semi-IPN's) since only the silicone component is vulcanized or cross-linked in the thermoplastic matrix. The interpenetrating polymer network is formed by vulcanizing a hydride functional silicone group and a polymer containing at least one unsaturated group, preferably a vinyl group, during normal thermoplastic melt processing. See U.S. Pat. No. 4,500,688 and pending U.S. Pat. application Ser. No. 577,113 of Barry C. Arkles.

The pseudo- or semi-IPN's have the advantages of exhibiting surface and di-electric properties which approach those of silicones and mechanical properties which approach those of the thermoplastic matrix. In many cases, properties such as wear, lubricity and heat and abrasion resistance of the thermoplastics are improved. While this technology was originally developed in polyurethane systems, it has been extended to other thermoplastic elastomers and engineering thermoplastics. For example, pending U.S. Pat. application Ser. No. 577,113 of Petrarch Systems Inc. discloses that polyamide (nylon) and polyester engineering thermoplastics have been formulated into materials which appear to be particularly well suited for gear and bearing applications, with the heat distortion temperature of nylon 6,6 being increased by the incorporation of 5 wt % silicone IPN.

However, the major uses of silicone IPN's have still been in the modification of lower modulus thermoplastics, particularly elastomers. To applicant's knowledge, the silicone IPN's have not been used or recognized to improve the shrinkage and/or warpage characteristics of high modulus thermoplastic materials, i.e., thermoplastic materials which in the unfilled state have a flexural modulus greater than 90,000 psi, as measured by ASTM D790.

BRIEF SUMMARY OF THE INVENTION

The compositions of the present invention are melt processable, fiber reinforced, high modulus (unfilled flexural modulus greater than 90,000 psi) thermoplastics which contain a silicone component which will form pseudo-interepenetrating polymer networks within the thermoplastic matrix. The silicone component is vulcanized by the reaction of a hydride-containing silicone, with the vulcanization reaction being initiated during thermoplastic melt processing of the silicone component and thermoplastic matrix. The silicone component comprises about one to twenty weight percent of the total composition, and the hydride group-containing silicone is reacted with a polymer containing at least one unsaturated group, preferably a vinyl group, which may be on a silicone or other polymeric compound.

Composites produced from the compositions of the invention have substantially reduced warpage and shrinkage, including substantially isotropic shrinkage characteristics, as compared to conventional fiber reinforced thermoplastics without the silicone IPN's. The composites are useful, for example, in the production of high tolerance parts, such as gears, as well as thin walled, variable thickness and thick cross section parts.

DETAILED DESCRIPTION OF THE PREFERRED EMBODIMENTS

The fiber reinforced thermoplastics to which the present invention is directed are generally those of the type which are referred to as engineering plastics, namely plastics with high mechanical properties, including high impact strength, high flexural modulus and high heat distortion temperatures. In general, these engineering materials include the main classes of crystalline thermoplastics (i.e., polyamides (nylons), polyesters, polyolefins, polyacetals and fluoropolymers).

The thermoplastic resins which are used in the present invention may be conveniently referred to as high modulus thermoplastics, i.e., those having a high flexural modulus. As used herein the term "high modulus" refers to a flexural modulus of the unfilled thermoplastic resin greater than 90,000 psi, as measured by ASTM specification No. D790. Of course, the flexural modulus of the fiber reinforced high modulus thermoplastics will range to psi's in the hundreds of thousands or millions.

The high modulus thermoplastic resins which may be used as matrix materials in the present invention include, but are not limited to, polyamides, polycarbonates, styrenics (i.e., the styrene plastics family including polystyrene and high modulus copolymers thereof such as styrene-acrylonitrile (SAN), acrylonitrile-styrene-butadiene copolymers (ABS), etc.), polyacetals, polyolefins, polyesters, polysulfones, polyphenylene sulfides, fluoropolymers, (e.g., fluorinated ethylene-propylene copolymer (FEP), perfluoroalkoxy tetrafluoroethylene (PFA), ethylene-tetrafluoroethylene (ETFE), polyvinylidene fluoride (PVDF), ethylene-chlorotrifluoroethylene (ECTFE), etc.) polyetherimides, polyether ether ketones (PEEK), polyacrylics, polyamide-imides, and polyvinyl chloride. These high modulus thermoplastics are to be distinguished from the relatively low modulus thermoplastics (flexural modulus less than 90,000 psi) such as thermoplastic polyurethanes, polyolefin elastomers, polyamide-polyether elastomer base resins, polyester elastomers, etc.

The fibrous reinforcing agents used to reinforce the thermoplastic matrix materials of the present invention include a wide variety of fiber types, including glass, carbon, organic (including aramid and the like), ceramic, boron, metal, and reinforcing mineral fibers, such as processed mineral fibers (PMF).

The invention is particularly advantageous with high aspect (high length/diameter) ratio fibers, since the higher the ratio, the more anisotropy there is in the shrinkage characteristics. High aspect ratio fibers are generally considered to be those with a length/diameter ratio greater than about 40:1, although lower ratio fibers are still considered to be within the invention. Brittle fibers such as glass, carbon and ceramic tend to break during melt processing. For example, ⅛ inch glass fibers after melt processing of the reinforced matrix have an aspect ratio ranging from about 20:1 to 300:1. Composites containing very low aspect fibers are already low in warpage and shrinkage differential, and such fibers may be considered to be essentially fillers.

The fiber reinforcement is present in the compositions of the invention in amounts of about 5 to 60 weight percent, preferably about 10 to 50 weight percent, and typically about 30 weight percent, based on the total weight of the composition. There is no significant warpage of composites at fiber loadings below about 5 weight percent, and the warpage problem does not become serious until fiber loadings of about 7 or 8 weight percent are reached. The above fibrous reinforcing agents are well known in the art, and the usual amounts to be used are obvious to those skilled in the art. Any adjustments due to the present invention should require a minimum of experimentation.

In addition to the reinforcing fibers, the compositions and resulting composites which may be modified according to the present invention may also contain other filler/modifiers such as glass beads; particulate minerals (e.g. mica, talc, kaolin, clays); flame retardant additives (e.g. decabromodiphenylene oxide (DBDO), antimony trioxide ($Sb_2O_3$), aluminum hydroxide ($Al(OH)_3$)); lubricants, such as polytetrafluoroethylene (PTFE), molybdenum disulfide ($MoS_2$) and graphite powder; bismuth oxides; metal powders, such as tungsten powder; carbon powders; aluminum flakes; magnetic powders, such as barium ferrite; etc. As mentioned above, low aspect fibers may also be used as particulate fillers, and other such fibers may include potassium titanate, wollastonite and Franklin fibers, for example.

The fillers may be present in the compositions and composites of the present invention in amounts of about 1 to 40 weight percent of the composition depending upon the particular filler and desired use of the filler. All of the above fillers are well known in the art, and appropriate amounts for the intended purpose will be obvious to those skilled in the art.

According to the present invention, fiber reinforced, and optionally filled, thermoplastic resin compositions having a high flexural modulus may be advantageously modified in their shrinkage and warpage characteristics by incorporating about 1 to 20 weight percent and preferably about 3 to 10 weight percent of a silicone component which forms an interpenetrating polymer network (IPN) in the thermoplastic matrix. The formation of such pseudo- or semi-IPN's of silicone in thermoplastic matrices is described in detail in U.S. Pat. No. 4,500,688 issued Feb. 19, 1985 to Barry C. Arkles for "Curable Silicone Containing Compositions and Methods of Making Same" and in pending U.S. Pat. application Ser. No. 577,113 filed Feb. 6, 1984 by Barry C. Arkles for "Curable Silicone Pseudo-Interpenetrating Polymer Networks and Methods of Making Same" (see published Japanese patent application No. 68531/83 (Public Disclosure No. 18925783) and German Offenlegungschrift No. P 33 14 355.2). The disclosures of that patent and patent application are incorporated herein by reference.

In general, the polymerizing silicone phase is made up of two reactive prepolymers: (1) a polymeric silicone which contains silicone hydride (Si-H) groups and (2) a polymeric component which contains unsaturated groups, preferably vinyl groups. Non-limiting examples of other unsaturated groups that can be employed include allyl and hexenyl. Alternatively, both the hydride and unsaturated group can be part of one polymeric silicone. Still, further, the vinyl or other unsaturated group may be on a polymeric silicone compound or on a non-silicone polymer such as a vinyl polymer. These prepolymers are melt-mixed with a thermoplastic matrix esin and reinforcing fibers, and optionally other fillers, in a melt extruder, and the extrudate is pelletized.

A catalyst, generally a platinum complex, is added to the pellets, which are then fed into melt forming apparatus, such as an injection molding machine or extruder, for melt forming. The heat from the forming process triggers a catalyst-induced addition reaction (which may be referred to as vulcanization) between the hydride and vinyl groups of the reactive prepolymers, which results in the interpenetrating polymer network of silicone polymer forming (cross linking and/or chain extending) throughout the fiber reinforced thermoplastic composite.

While the Arkles patent and application indicate that the ratio of hydride groups to vinyl groups should be about 1.2:1 to 6:1 and such ratios are preferable in the present invention, such theoretical ratios are sometimes not obtainable in high modulus thermoplastics. For example, with high temperature thermoplastic matrices, such as polyphenylene sulfide, polycarbonates and polysulfones, it is often only possible because of stability problems to use hydride/vinyl ratios of about 1:1 to 1.5:1.

A number of variations of the above are possible, some of which are illustrated in the above patent and pending application. For example, the two reactive prepolymers may be included in separate pellets of the thermoplastic matrix resin, with the catalyst being included in the pellets of one of the prepolymers. Similiarly, the reinforcing fibers and other fillers, if present, may be included in either or both types of pellets, but are preferably premixed with the thermoplastic matrix resin. The particular order of mixing the various components, consistent with conventional melt processing techniques, is not particularly critical, except that the catalyst for the silicone component must be isolated or otherwise maintained in an unreactive state until it is desired to initiate the vulcanization of the silicone component during meltprocessing (i.e., melt mixing or melt forming).

It has been unexpectedly found that composites formed from the compositions of the present invention exhibit substantially reduced shrinkage and post-warpage. In particular, as illustrated by the specific, non-limiting examples below, mold shrinkage may be reduced as much as 50% or more compared to conventional glass fiber reinforced thermoplastics. More importantly, the differential shrinkage between the transverse and flow directions is substantially reduced so that there is essentially isotropic shrinkage.

Greater uniformity of shrinkage between flow and transverse directions leads to reduced post warpage. Warpage values are calculated by measuring the out-of-plane distance from a specimen disk edge 90 degrees from the gate and dividing by the disk diameter. 90 degrees is the transverse direction in which greatest warpage is observed. Warpage is a dimensionless property which is measured according to the method of P. J. Cloud and M. A. Wolverton, "Predict Shrinkage and Warpage of Reinforced and Filled Thermoplastics" *Plastics Technoloqy* (November 1978).

Although applicant's do not wish to be bound by any particular theory as to the reasons for the unexpected reductions in mold shrinkage and warpage according to the present invention, it is believed that the matrix thermoplastics are, in fact, not "inert" but are greatly affected by the vulcanization process of the silicone IPN. Thus, the polymerizing silicone phase appears to change the morphology of the thermoplastic phase significantly, particularly in crystalline thermoplastics (i.e. polyamides, polyesters, polyolefins, polyacetals and fluoropolymers). The change in microstructure of the thermoplastic matrix results in composites exhibiting reduced mold shrinkage and highly isotropic shrinkage behavior. More importantly, this effect is observed to an even greater extent in fiber reinforced thermoplastic compositions where the improved shrinkage characteristics greatly offset the anisotropy imposed by fibers on the composite.

The greatly reduced mold shrinkage, highly isotropic shrinkage behavior and reduced warpage obtained by the present invention make the compositions particularly useful for the production of intricate parts by various melt forming processes including injection molding, profile extrusion, transfer molding and compression molding. For example, gears molded from the compositions of the present invention show a significant reduction in tooth to tooth error and total composite error (TCE), since the gear is rounder and less egg shaped (elliptical). The gears have a higher gear rating due to better accuracy and tolerance, less noise, better transmission, etc.

Reduced warpage is also particularly important in the melt forming of thin parts (e.g. keyboards), long dimension parts, and variable section moldings (e.g. gears). Since warpage becomes more pronounced in longer molding runs, the significant decrease in warpage of parts is particularly important. In thick cross section parts (e.g. valve bodies), reduction of shrinkage and differential shrinkage results in less stress cracking and fewer voids. As shown in example 1 below, warpage may be reduced according to the present invention by a factor of about ten.

In addition to the reduced shrinkage and warpage characteristics described above, compositions of the present invention may exhibit a number of other improved properties, including reduced wear factors (improved wear resistance), reduced coefficients of friction, enhanced flow modification and mold release, lower void formation (reduced porosity) and lower molded-in stresses, enhanced impact strength and increased heat distortion temperature. In general, higher cross-link densities in the silicone IPN yield better properties than lower crosslinked densities.

In the following specific examples, composites were formed and tested according to the following general method. Compositions of the invention were melt-mixed in a 2½ inch single screw extruder under standard conditions for the matrix resin to form pellets. A platinum complex catalyst was tumbled onto the surface of the pellets. Four inch diameter, 1/16 inch thick edge-gated sample disks were then injection molded from the pellets under standard conditions for the matrix resin, and the vulcanization of the silicone component proceeded during the molding. Mold shrinkage values were measured according to ASTM specification D955 in both the melt-flow and transverse direction on the disks.

EXAMPLE 1

Nylon 6,6 composites were prepared and tested as described above. Monsanto Vydyne 21 (nylon 6,6) resin was used as the matrix thermoplastic. PPG 3540 ⅛ inch was used as the glass fiber (GF) reinforcement. The silcone component (IPN) was 9 parts (i.e. 4.5 wt %) polydimethylsiloxane, vinyldimethylsiloxy terminated to 1 part (i.e. 0.5 wt %) polydimethylsiloxane—30% methylhydrosiloxane copolymer, trimethylsiloxy terminated. The PTFE lubricant powder used was LNP TL-156. The IPN composites were found to exhibit lower mold shrinkage and less differential shrinkage in the flow and transverse directions. IPN composites also showed tenfold reductions in part warpage compared to conventional glass fiber reinforced nylon 6,6.

The PTFE lubricated, IPN composite molded as a high tolerance gear exhibited 28 mils total composite error. This led to an AGMA (American Gear Manufacturers Association) gear performance rating of 8. Conventional glass reinforced nylon 6,6 exhibited 55 mils total composite error, earning a lower AGMA rating of 6.

| Composite | Mold Shrinkage (in/in) | | Warpage |
|---|---|---|---|
| | Flow Direction | Transverse Direction | |
| nylon 6,6 with 30 wt % GF | .004 | .006 | .270 |
| nylon 6,6 with 30 wt % GF and 5 wt % IPN | .003 | .004 | .035 |
| nylon 6,6 with 30 wt % GF, 10 wt % PTFE lubricant powder, 5 wt % IPN | .002 | .003 | .023 |

EXAMPLE 2

Nylon 6,6 composites were prepared and tested as described above. Monsanto Vydyne 21 resin was the nylon 6,6 used. The PAN carbon fiber (CF) used was Hercules 1800AS. The silicone component (IPN) was 2 parts (2 wt %) polydimethylsiloxane, vinyldimethylsiloxy terminated to 3 parts (3 wt %) of (0.5–1%) methylhydro-dimethylsiloxane, trimethylsiloxy terminated. The PTFE lubricant powder was LNP TL-156. Lower mold shrinkage and more uniform shrinkage in the flow and transverse directions were observed in the IPN composite.

| Composite | Mold Shrinkage (in/in) | |
|---|---|---|
| | Flow Direction | Transverse Direction |
| nylon 6,6 with 15 wt % PTFE lubricant powder and 30 wt % CF | .002 | .003 |
| nylon 6,6 with 10 wt % PTFE lubricant powder, 30 wt % CF and 5 wt % IPN | .0016 | .0018 |

EXAMPLE 3

Flame retardant, glass fiber reinforced nylon 6 composites were prepared and tested as described above. The nylon 6 matrix resin used in the composites was Badische 300. PPG 3540 ⅛ inch was used as the glass fiber (GF) reinforcement. The silicone component (IPN) was the same as in Example 1. Decabromodiphenyl oxide (DBDO) (FR300BA from Dow Chemical) served as the halogenated flame retardant and antimony trioxide ($Sb_2O_3$) was used as a synergist. The IPN composite exhibited lower differential shrinkage rates in the flow and transverse directions. This isotropic shrinkage behavior led to the successful molding of the IPN composite as a warp-free keyboard frame; molding of the non-IPN composite led to warpage in the part.

| Composite | Mold Shrinkage (in/in) | |
|---|---|---|
| | Flow Direction | Transverse Direction |
| nylon 6 with 30 wt % GF, 15 wt % DBDO, and 5 wt % $Sb_2O_3$ | .003 | .005 |
| nylon 6 with 30 wt % GF, 15 wt % DBDO, 5 wt % $Sb_2O_3$, and 5 wt % IPN. | .003 | .003 |

EXAMPLE 4

Polyetherimide (GE Ultem 1000) composites were prepared and tested as described above. PPG 3540 ⅛ inch was used as the glass fiber (GF) reinforcement and the PTFE lubricant powder was LNP TL#2. The silicone component (IPN) was 3 parts (3 wt %) polydimethylsiloxane - 5% diphenylsiloxane copolymer, vinyldimethylsiloxy terminated and 2 parts (2 wt %) of (0.5-1%) methylhydro-dimethyl siloxane, trimethylsiloxy terminated. The IPN composite exhibited lower overall shrinkage and more uniform shrinkage in the flow and transverse directions.

| Composite | Mold Shrinkage (in/in) | |
|---|---|---|
| | Flow Direction | Transverse Direction |
| Polyetherimide with 30 wt % GF. | .0037 | .0045 |
| Polyetherimide with 30 wt % GF, 10 wt % PTFE lubricant powder, and 5 wt % IPN. | .0030 | .0035 |

EXAMPLE 5

A 50% glass fiber reinforced nylon 6,10-IPN using the same silicone component as Example 1, has been successfully molded into a large down hole tool used in oil well maintenance. The 10 pound part is 20" long with 3" thick walls. The isotropic shrinkage behavior of the IPN composites produced lower molded-in-stress in these thick sections and led to the absence of porosity in the finished part. The internal lubrication characteristic of the IPN reduces part surface wear and results in lower frictional heat generation as the tool slides against the metal wellpipe.

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

We claim:
1. A melt processable composition comprising:
   a. a thermoplastic matrix material comprising a thermoplastic which has an unfilled flexural modulus greater than 90,000 psi;
   b. a hydride group-containing silicone and a component which will react with said hydride group-containing silicone, said silicone and said component being selected and present in sufficient amounts to react with each other by vulcanization within said thermoplastic matrix to form a silicone semi-interpenetrating polymer network, said vulcanization of said silicone and said component being initiated during the thermoplastic melt-processing of said silicone and said component with said matrix; and
   c. a fibrous reinforcing agent mixed with said matrix material, said silicone and or said component.

2. A melt processable composition according to claim 1 including a catalyst to catalyze the reaction of said silicone and said component.

3. A melt processable composition according to claim 2 wherein said catalyst is a platinum catalyst.

4. A melt processable composition according to claim 1 wherein said thermoplastic matrix is selected from the group consisting of polyamides, polycarbonates, polystyrene, styrene-acrylonitrile copolymers, acrylonitrile-styrene-butadiene copolymers, polyacetals, polyolefins, polyesters, polysulfones, polyphenylene sulfides, fluoropolymers, polyetherimides, polyether ether ketones, polyacrylics, polyamide-imides, and polyvinyl chloride.

5. A melt processable composition according to claim 1 wherein said fibrous reinforcing agent is selected from the group consisting of glass, carbon, aramid, ceramic, boron, metal, and reinforcing mineral fibers other than glass and ceramic fibers.

6. A melt processable composition according to claim 5 wherein said fibers are present in an amount of about 5 to 60 weight percent of the composition.

7. A melt processable composition according to claim 1 which also includes a modifier selected from the group consisting of glass beads, particulate minerals, flame retardant additives, lubricants, bismuth salts, metal powders, carbon powders, aluminum flakes, and magnetic powders.

8. A melt processable composition according to claim 7 wherein said modifier is present in an amount of about 1 to 40 weight percent of the composition.

9. A melt processable composition according to claim 1 wherein said network comprises about 1 to 20 weight percent of the total composition.

10. A melt processable composition according to claim 1 wherein said network comprises the reaction product of a polymeric hydride group-containing silicone and a polymer containing at least one unsaturated group.

11. A melt processable composition according to claim 10 wherein said unsaturated group comprises a vinyl group.

12. A melt processable composition according to claim 11 wherein the vinyl group is on a polymeric silicone compound.

13. A melt processable composition according to claim 11 wherein the vinyl group is on a vinyl polymer.

14. A melt formed composite having reduced mold shrinkage and warpage, comprising
   (a) A thermoplastic matrix comprising a thermoplastic resin having an unfilled flexural modulus greater than 90,000 psi;
   (b) a silicone interpenetrating polymer network vulcanized within said thermoplastic matrix, said network comprising the reaction product of a hydride group-containing silicone and a component which will react with said hydride group-containing silicone; and
   (c) a fibrous reinforcing agent uniformly dispersed in said thermoplastic matrix.

15. A melt formed composite according to claim 14 wherein said thermoplastic resin is selected from the group consisting of polyamides, polycarbonates, polystyrene, styrene-acrylonitrile copolymers, acrylonitrile-styrene-butadiene copolymers, polyacetals, polyolefins, polyesters, polysulfones, polyphenylene sulfides, fluoropolymers, polyetherimides, polyether ether ketones, polyacrylics, polyamide-imides, and polyvinyl chloride.

16. A melt formed composite according to claim 14 wherein said fibrous reinforcing agent is selected from the group consisting of glass, carbon, aramid, ceramic, boron, metal, and reinforcing mineral fibers other than glass and ceramic fibers.

17. A melt formed composite according to claim 14 wherein said fibrous reinforcing agent comprises about 5 to 60 weight percent of the composite.

18. A melt formed composite according to claim 14 wherein said silicone interpenetrating polymer network comprises about 1 to 20 weight percent of the composite.

19. A melt formed composite according to claim 14 wherein said silicon interpenetrating polymer network is the reaction product of a hydride group-containing silicone and a polymer containing unsaturated groups.

20. A melt formed composite according to claim 14 in the form of a gear.

21. A method of reducing mold shrinkage and warpage in a thermoplastic molding resin having an unfilled flexural modulus greater than 90,000 psi and a fibrous reinforcing agent uniformly dispersed in said thermoplastic molding resin, comprising adding to said thermoplastic resin prior to or during thermoplastic melt processing a silicone component which will be vulcanized by the reaction of a hydride-containing silicone within said thermoplastic resin to form a silicone semi-interpenetrating polymer network, initiating the vulcanization of said silicone component by thermoplastic melt processing of said component within said thermoplastic resin, and molding said resin into a fiber-reinforced part.

22. A method according to claim 21 wherein said molded part is a high tolerance, thin walled, variable thickness, or thick cross-section part.

* * * * *